United States Patent
Fedeyko et al.

(10) Patent No.: US 9,757,718 B2
(45) Date of Patent: Sep. 12, 2017

(54) AMMONIA SLIP CATALYST HAVING PLATINUM IMPREGNATED ON HIGH POROSITY SUBSTRATES

(71) Applicant: Johnson Matthey Public Limited Company, London (GB)

(72) Inventors: Joseph Michael Fedeyko, Glen Mills, PA (US); Hai-Ying Chen, Conshohocken, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/707,065

(22) Filed: May 8, 2015

(65) Prior Publication Data
US 2015/0321184 A1 Nov. 12, 2015

Related U.S. Application Data

(60) Provisional application No. 61/990,963, filed on May 9, 2014.

(51) Int. Cl.
*B01D 53/56* (2006.01)
*B01D 53/94* (2006.01)
(Continued)

(52) U.S. Cl.
CPC ........ *B01J 29/763* (2013.01); *B01D 53/9418* (2013.01); *B01J 21/04* (2013.01); *B01J 21/063* (2013.01); *B01J 21/08* (2013.01); *B01J 23/42* (2013.01); *B01J 23/44* (2013.01); *B01J 29/072* (2013.01); *B01J 35/0006* (2013.01); *B01J 35/0066* (2013.01); *B01J 35/04* (2013.01); *B01J 37/0244* (2013.01); *B01J 37/0246* (2013.01); *B01D 2255/1021* (2013.01); *B01D 2255/1023* (2013.01); *B01D 2255/2042* (2013.01);
(Continued)

(58) Field of Classification Search
CPC ... B01J 23/42; B01J 23/44; B01J 29/06; B01J 35/04; B01J 35/0006; B01J 35/0066; B01J 29/072; B01D 53/9418
USPC .................... 502/73, 74, 332–334, 339, 439; 423/213.2, 213.5, 239.1, 239.2
See application file for complete search history.

(56) References Cited

U.S. PATENT DOCUMENTS

| 4,010,238 | A | 3/1977 | Shiraishi et al. |
| 4,085,193 | A | 4/1978 | Nakajima et al. |

(Continued)

FOREIGN PATENT DOCUMENTS

| WO | 2012138405 A1 | 10/2012 |
| WO | 2014083431 A2 | 6/2014 |

(Continued)

*Primary Examiner* — Cam N. Nguyen

(57) ABSTRACT

Catalytic articles having a high porosity substrate containing platinum, palladium or a mixture thereof, in walls of the high porosity substrate and an SCR catalyst coating on a wall of the high porosity substrate are disclosed. The platinum, palladium or mixture thereof can be present in the wall of the high porosity support as a metal, or as a supported platinum, palladium or a mixture thereof. The catalytic articles are useful for selective catalytic reduction (SCR) of NOx in exhaust gases and in reducing the amount of ammonia slip. Methods for producing such articles are described. Methods of using the catalytic articles in an SCR process, where the amount of ammonia slip is reduced, are also described.

26 Claims, 4 Drawing Sheets

(51) Int. Cl.
  *B01J 29/06* (2006.01)
  *B01J 29/072* (2006.01)
  *B01J 23/42* (2006.01)
  *B01J 23/44* (2006.01)
  *B01J 35/00* (2006.01)
  *B01J 35/04* (2006.01)
  *B01J 29/76* (2006.01)
  *B01J 21/08* (2006.01)
  *B01J 21/04* (2006.01)
  *B01J 21/06* (2006.01)
  *B01J 37/02* (2006.01)

(52) U.S. Cl.
  CPC ............ *B01D 2255/2045* (2013.01); *B01D 2255/2047* (2013.01); *B01D 2255/2063* (2013.01); *B01D 2255/2065* (2013.01); *B01D 2255/2073* (2013.01); *B01D 2255/2094* (2013.01); *B01D 2255/20707* (2013.01); *B01D 2255/20715* (2013.01); *B01D 2255/20723* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20776* (2013.01); *B01D 2255/20784* (2013.01); *B01D 2255/30* (2013.01); *B01D 2255/50* (2013.01); *B01J 2229/186* (2013.01)

(56) References Cited

U.S. PATENT DOCUMENTS

| | | | |
|---|---|---|---|
| 7,998,432 B2 * | 8/2011 | Rousseau | B01L 3/50855 422/401 |
| 8,568,674 B1 | 10/2013 | Sung et al. | |
| 8,637,426 B2 * | 1/2014 | Hoke | B01D 53/945 502/333 |
| 8,663,587 B2 * | 3/2014 | Boorse | B01D 53/9431 422/171 |
| 9,114,376 B2 * | 8/2015 | Fedeyko | B01J 29/74 |
| 9,120,077 B2 * | 9/2015 | Wei | B01D 53/944 |
| 9,138,732 B2 * | 9/2015 | Bull | B01D 53/9418 |
| 9,163,218 B2 * | 10/2015 | Pei | C12N 5/0696 |
| 9,283,547 B2 * | 3/2016 | Alive | B01J 23/63 |
| 9,440,192 B2 * | 9/2016 | Hoke | B01D 53/945 |
| 2009/0246103 A1 | 10/2009 | Ohno et al. | |
| 2010/0166629 A1 * | 7/2010 | Deeba | B01D 53/944 423/213.5 |
| 2010/0196221 A1 | 8/2010 | Ando et al. | |
| 2011/0078997 A1 | 4/2011 | Boorse et al. | |
| 2011/0182791 A1 | 7/2011 | Fedeyko et al. | |
| 2011/0268635 A1 * | 11/2011 | Boorse | B01D 53/9418 423/213.7 |
| 2013/0156668 A1 | 6/2013 | Spurk et al. | |
| 2014/0044630 A1 | 2/2014 | Swallow et al. | |
| 2014/0154163 A1 | 6/2014 | Andersen et al. | |
| 2014/0212350 A1 | 7/2014 | Andersen et al. | |
| 2015/0031526 A1 * | 1/2015 | Micallef | B01J 38/02 502/61 |
| 2015/0037233 A1 * | 2/2015 | Fedeyko | B01D 53/8628 423/239.1 |

FOREIGN PATENT DOCUMENTS

| | | |
|---|---|---|
| WO | 2014120645 A1 | 8/2014 |
| WO | 2015017516 A2 | 2/2015 |

* cited by examiner

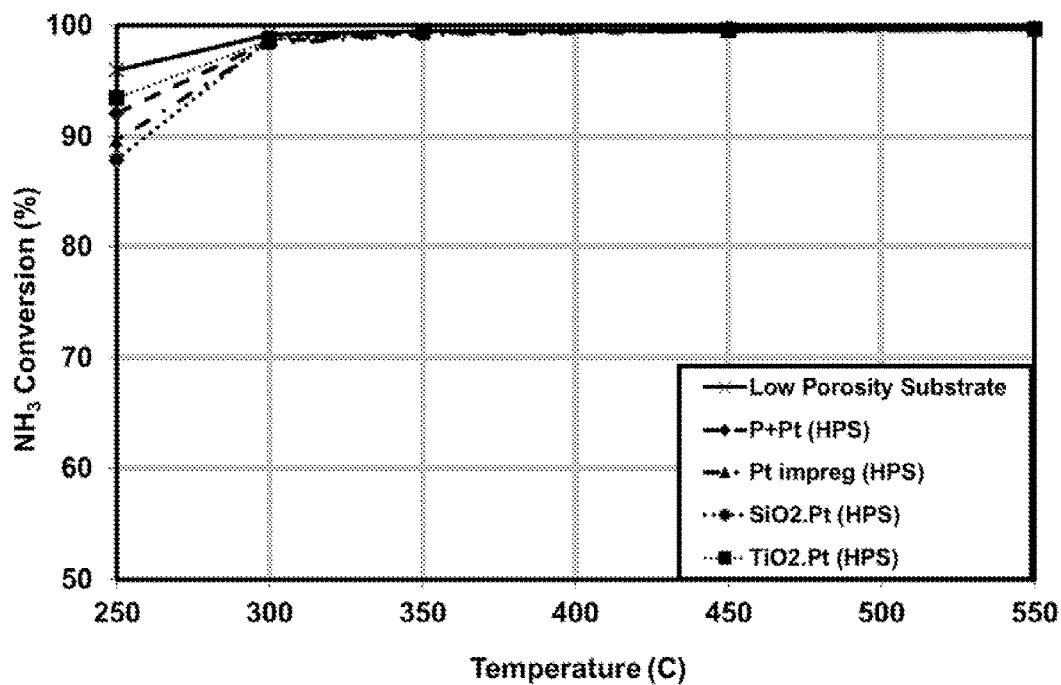
Fig. 1. NH₃ Conversion at a Space velocity of 60,000 h⁻¹
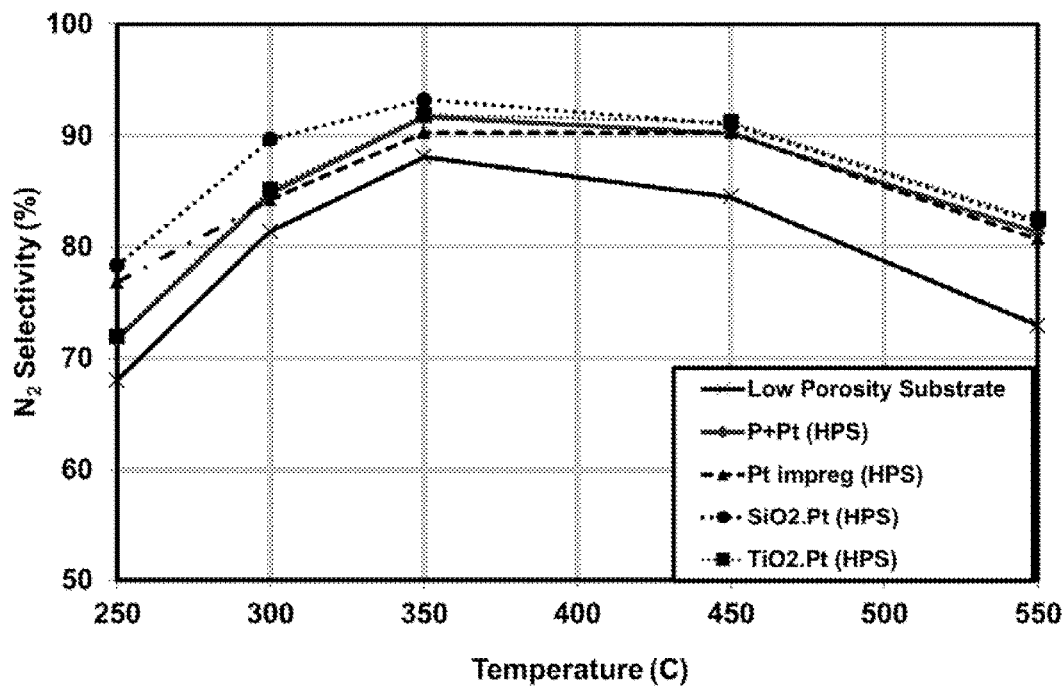
Fig. 2. N₂ Selectivity at a Space velocity of 60,000 h⁻¹

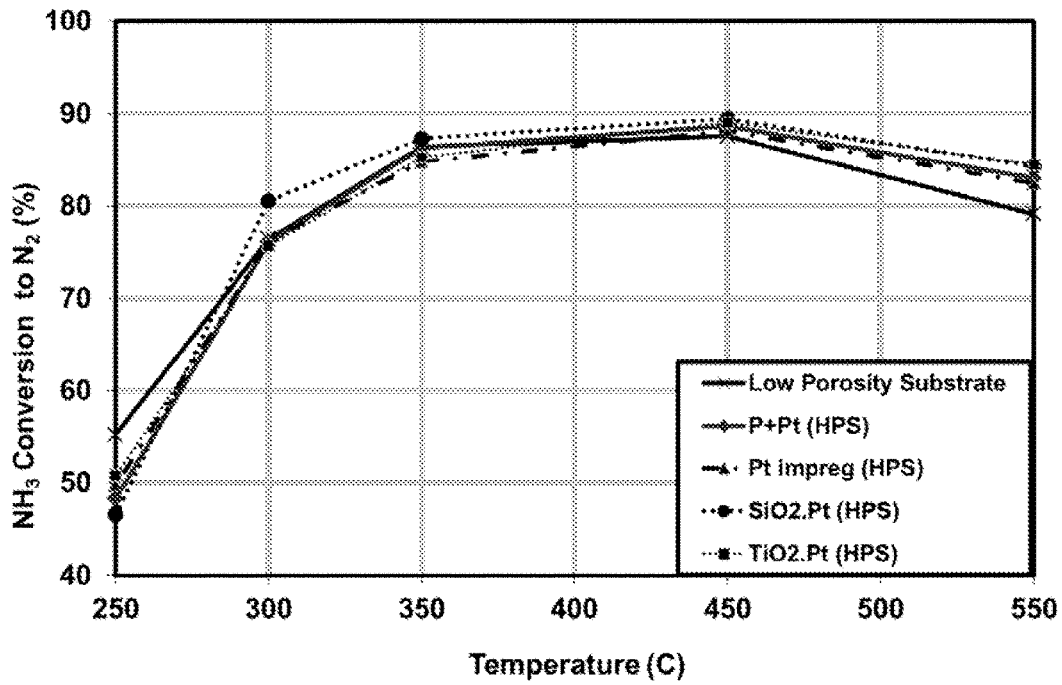
Fig. 3. NH₃ Conversion at a Space velocity of 120,000 h⁻¹
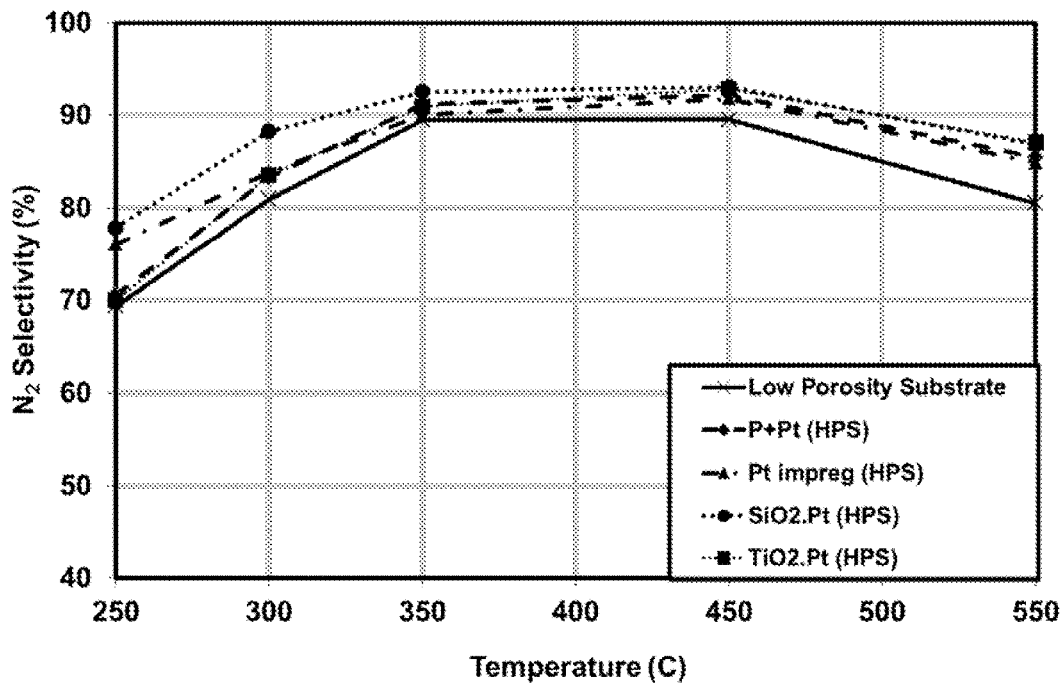
Fig. 4. N₂ Selectivity at a Space velocity of 120,000 h⁻¹

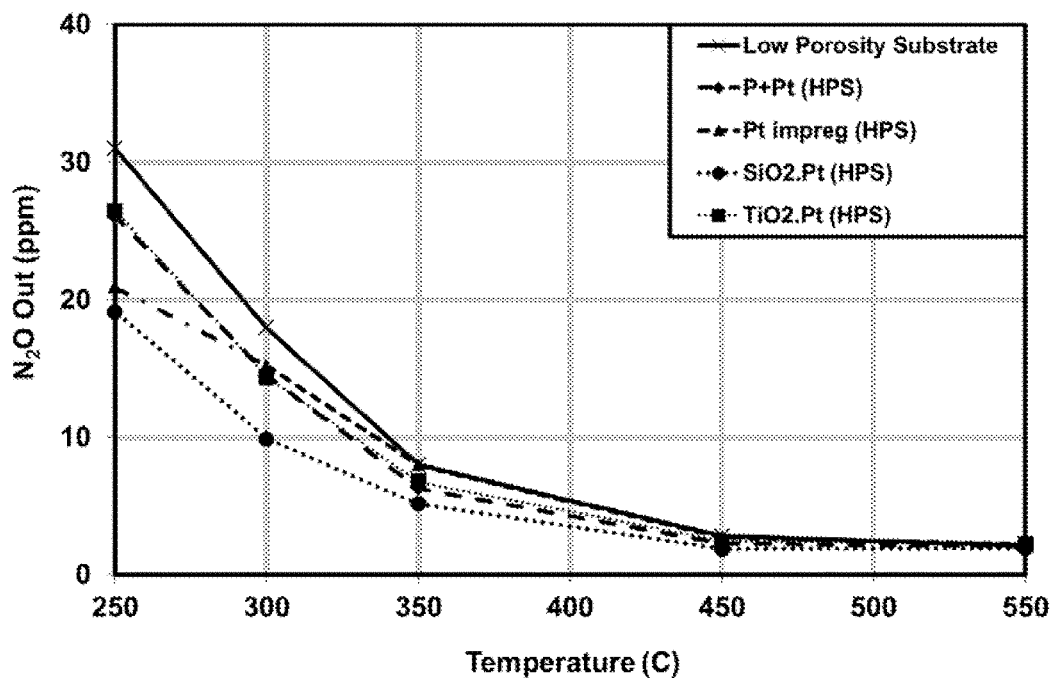
Fig. 5. N$_2$O Concentration (ppm) at Outlet from System at a Space velocity of 60,000 h$^{-1}$
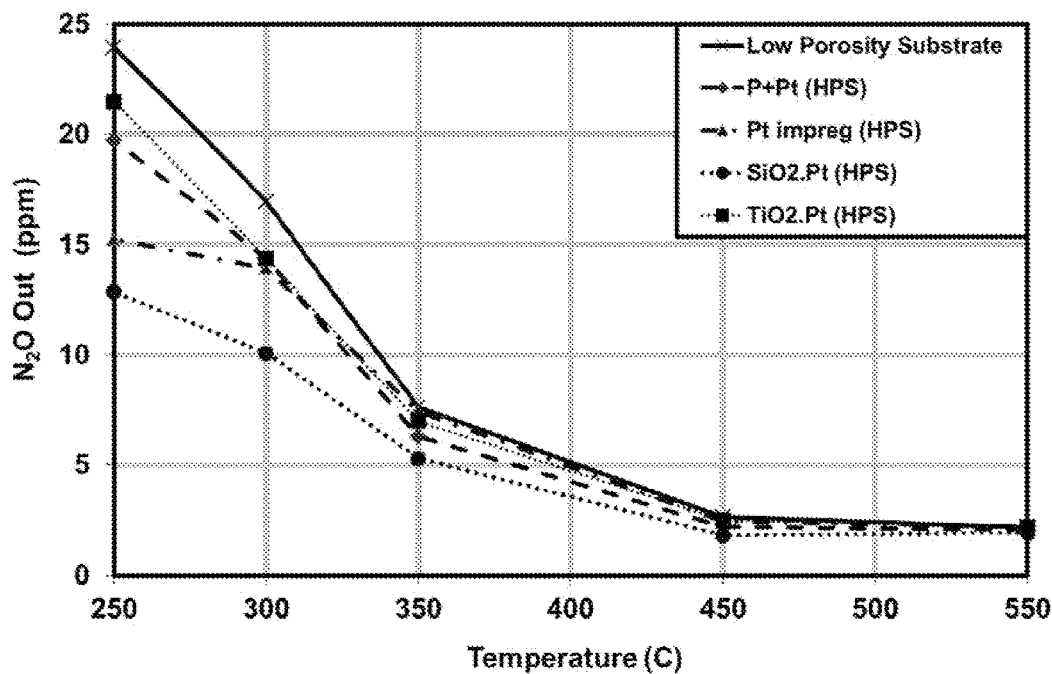
Fig. 6. N$_2$O Concentration (ppm) at Outlet from System) at a Space velocity of 120,000 h$^{-1}$

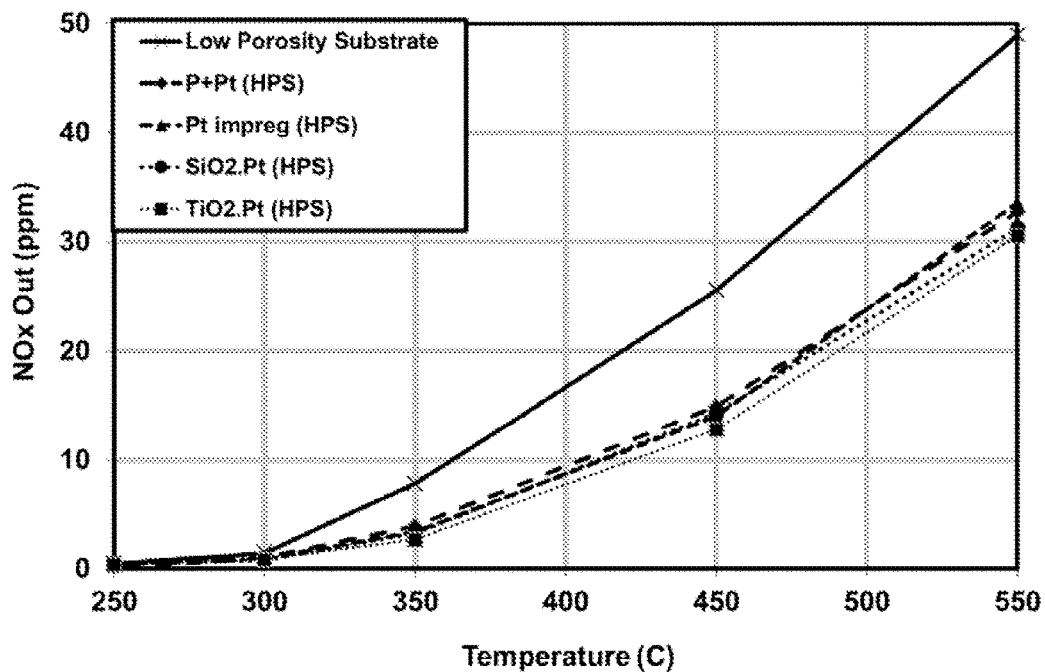
Fig. 7. NOx Concentration (ppm) at Outlet from System at a Space velocity of 60,000 h$^{-1}$
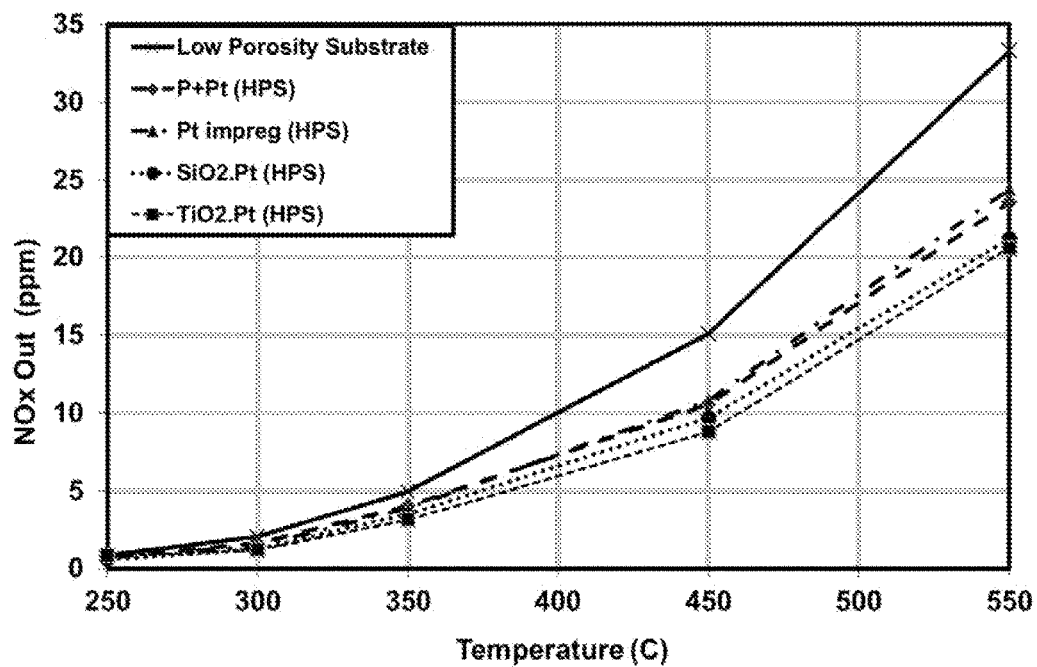
Fig. 8. NOx Concentration (ppm) at Outlet from System at a Space velocity of 120,000 h$^{-1}$

AMMONIA SLIP CATALYST HAVING PLATINUM IMPREGNATED ON HIGH POROSITY SUBSTRATES

FIELD OF THE INVENTION

The invention relates to articles comprising ammonia slip catalysts (ASC) and methods of manufacturing and using such articles to reduce ammonia slip.

BACKGROUND OF THE INVENTION

Hydrocarbon combustion in diesel engines, stationary gas turbines, and other systems generates exhaust gas that must be treated to remove nitrogen oxides (NOx), which comprises NO (nitric oxide) and $NO_2$ (nitrogen dioxide), with NO being the majority of the NOx formed. NOx is known to cause a number of health issues in people as well as causing a number of detrimental environmental effects including the formation of smog and acid rain. To mitigate both the human and environmental impact from $NO_x$ in exhaust gas, it is desirable to eliminate these undesirable components, preferably by a process that does not generate other noxious or toxic substances.

Exhaust gas generated in lean-burn and diesel engines is generally oxidative. NOx needs to be reduced selectively with a catalyst and a reductant in a process known as selective catalytic reduction (SCR) that converts NOx into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalyzed substrate. In order to maximize the conversion of NOx, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore the release of ammonia in exhaust gas should be eliminated. In many conventional exhaust systems, an ammonia oxidation catalyst (also known as an ammonia slip catalyst or "ASC") is installed downstream of the SCR catalyst to remove ammonia from the exhaust gas by converting it to nitrogen. The use of ammonia slip catalysts can allow for $NO_x$ conversions of greater than 90% over a typical diesel driving cycle.

It would be desirable to have a catalyst article that provides for both NOx removal by SCR and for selective ammonia conversion to nitrogen, where ammonia conversion occurs over a wide range of temperatures in a vehicles driving cycle, and minimal nitrogen oxide byproducts are formed.

SUMMARY OF THE INVENTION

In one aspect, the invention relates to a catalytic article for treating a gas containing one or more nitrogen oxides and for reducing the amount of ammonia slip. A catalyst article comprises: (a) a high porosity substrate comprising platinum, palladium or a mixture thereof in the wall of the high porosity substrate and (b) an SCR catalyst coating on a wall of the high porosity substrate, where the platinum, palladium or mixture thereof is present in the wall of the high porosity support as a metal, or as a supported platinum, palladium or a mixture thereof.

In another aspect, the invention relates to methods for producing a catalytic article useful for selective catalytic reduction of nitrogen oxides and for reducing the amount of ammonia slip using the methods.

In yet another aspect, the invention relates to a process for selectively reducing nitrogen oxides in a gaseous mixture comprising nitrogen oxides in the presence of a reductant and also reducing ammonia slip by using a catalytic article described herein.

BRIEF DESCRIPTION OF THE DRAWINGS

FIG. 1 is a graph showing the percent conversion of ammonia to nitrogen using the articles of Examples 1-5 at a space velocity of 60,000 $h^{-1}$.

FIG. 2 is a graph showing $N_2$ selectivity using the articles of Examples 1-5 at a space velocity of 60,000 $h^{-1}$.

FIG. 3 is a graph showing the percent conversion of ammonia to nitrogen using the articles of Examples 1-5 at a space velocity of 120,000 $h^{-1}$.

FIG. 4 is a graph showing $N_2$ selectivity using the articles of Examples 1-5 at a space velocity of 120,000 $h^{-1}$.

FIG. 5 is a graph showing $N_2O$ concentration (ppm) at the outlet from the test system from the use of articles of Examples 1-5 at a space velocity of 60,000 $h^{-1}$.

FIG. 6 is a graph showing $N_2O$ concentration (ppm) at the outlet from the test system from the use of articles of Examples 1-5 at a space velocity of 120,000 $h^{-1}$.

FIG. 7 is a graph showing NOx concentration (ppm) at the outlet from the test system from the use of articles of Examples 1-5 at a space velocity of 60,000 $h^{-1}$.

FIG. 8 is a graph showing NOx concentration (ppm) at the outlet from the test system from the use of articles of Examples 1-5 at a space velocity of 120,000 $h^{-1}$.

DETAILED DESCRIPTION OF THE INVENTION

As used in this specification and the appended claims, the singular forms "a", "an" and "the" include plural referents unless the context clearly indicates otherwise. Thus, for example, reference to "a catalyst" includes a mixture of two or more catalysts, and the like.

As used herein, the term "ammonia slip", means the amount of unreacted ammonia that passes through the SCR catalyst.

As used herein, the term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi: 10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

As used herein, the term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

As used herein, the term "$N_2$ selectivity" means the percent conversion of ammonia into nitrogen.

In one aspect, a catalyst article comprises: (a) a high porosity substrate comprising platinum, palladium or a mixture thereof in the wall of the high porosity substrate and (b) an SCR catalyst coating on a wall of the high porosity substrate, where the platinum, palladium or mixture thereof is present in the wall of the high porosity support as a metal, or as a supported platinum, palladium or a mixture thereof. The platinum, palladium or a mixture thereof, or the supported platinum, palladium or a mixture thereof, can also present as a coating on the wall of the high porosity support.

High Porosity Substrate

The substrate for the catalyst may be any material typically used for preparing automotive catalysts that comprises a ceramic honeycomb structure or an extruded support. The term "high porosity substrate" refers to a substrate having a porosity of between about 40 and about 80%. The high porosity substrate can have a porosity preferably of at least about 45%, more preferably of at least about 50%. The high porosity substrate can have a porosity preferably of less than about 75%, more preferably of less than about 70%. The term porosity, as used herein, refers to the total porosity, preferably as measured with mercury porosimetry.

Any suitable substrate, such as a monolithic flow-through substrate, can be employed. Preferably the substrate has a plurality of fine, parallel gas flow passages extending from an inlet to an outlet face of the substrate, such that passages are open to fluid flow. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The passages, which are essentially straight paths from their fluid inlet to their fluid outlet, are defined by walls onto which the SCR catalyst is coated as a "washcoat" so that the gases flowing through the passages contact the catalytic material. The flow passages of the monolithic substrate are thin-walled channels which can be of any suitable cross-sectional shape such as trapezoidal, rectangular, square, triangular, sinusoidal, hexagonal, oval, circular, etc. The invention is not limited to a particular substrate type, material, or geometry.

Ceramic substrates may be made of any suitable refractory material, such as cordierite, cordierite-α alumina, α-alumina, silicon carbide, silicon nitride, zirconia, mullite, spodumene, alumina-silica magnesia, zirconium silicate, sillimanite, magnesium silicates, zircon, petalite, aluminosilicates and mixtures thereof.

Wall flow substrates may also be formed of ceramic fiber composite materials, such as those formed from cordierite and silicon carbide. Such materials are able to withstand the environment, particularly high temperatures, encountered in treating the exhaust streams.

The high porosity substrate comprises platinum, palladium or a mixture thereof in the wall of the high porosity substrate where the platinum, palladium or mixture thereof is present in the wall of the high porosity support as a metal, or as a supported platinum, palladium or a mixture thereof. The platinum, palladium or a mixture thereof, or the supported platinum, palladium or a mixture thereof, can also present as a coating on the wall of the high porosity support. The article can comprise from about 0.1 wt. % to about 1 wt. % of platinum or about 0.1 wt. % to about 2 wt. % of palladium. The amount of platinum in the article can be from about 0.1 wt. %, from about 0.2 wt. %, from about 0.3 wt. %, or from about 0.4 wt. %. The amount of platinum in the article can be a maximum of about 1 wt. %, about 0.9 wt. %, about 0.8 wt. %, about 0.7 wt. %, about 0.6 wt. %, or about 0.5 wt. %. The amount of palladium in the article can be from about 0.1 wt. %, from about 0.2 wt. %, from about 0.3 wt. %, from about 0.4 wt. %, from about 0.5 wt. %, from about 0.6 wt. %, from about 0.7 wt. %, from about 0.8 wt. % from about 0.9 wt. %, or from about 1.0 wt. %. The amount of palladium in the article can be a maximum of about 2 wt. %, about 1.8 wt. %, about 1.6 wt. %, about 1.4 wt. %, about 1.2 wt. %, about 1.0 wt. %, or about 0.8 wt. %. When both platinum and palladium are used, the amounts of each of the metals can be reduced from the amounts used when only one of these metals is used. The amounts that each of these metals can be used will depend upon a number of factors, including the amount of ammonia slip and the operating temperatures of the catalyst.

SCR Catalyst

The SCR catalyst can be an oxide of a base metal, a molecular sieve, a metal exchanged molecular sieve or a mixture thereof. The base metal can be selected from the group consisting of vanadium (V), molybdenum (Mo) and tungsten (W), chromium (Cr), cerium (Ce), manganese (Mn), iron (Fe), cobalt (Co), nickel (Ni), and copper (Cu), and mixtures thereof. SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, of which the entire contents are incorporated herein by reference. Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. These catalysts may contain other inorganic materials such as $SiO_2$ and $ZrO_2$ acting as binders and promoters.

When the SCR catalyst is a base metal, the catalyst article can further comprise at least one base metal promoter. As used herein, a "promoter" is understood to mean a substance that when added into a catalyst, increases the activity of the catalyst. The base metal promoter can be in the form of a metal, a oxide of the metal, or a mixture thereof. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The at least one base metal catalyst promoter can preferably be $MnO_2$, $Mn_2O_3$, $Fe_2O_3$, $SnO_2$, CuO, CoO, $CeO_2$ and mixtures thereof. The at least one base metal catalyst promoter may be added to the catalyst in the form of a salt in an aqueous solution, such as a nitrate or an acetate. The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat.

The SCR catalyst can comprises a molecular sieve or a metal exchanged molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

A zeolitic molecular sieve is a microporous aluminosilicate having any one of the framework structures listed in the Database of Zeolite Structures published by the International Zeolite Association (IZA). The framework structures include, but are not limited to those of the CHA, FAU, BEA, MFI, MOR types. Non-limiting examples of zeolites having these structures include chabazite, faujasite, zeolite Y, ultra-stable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

As used herein, the term "non zeolitic molecular sieve" refers to corner sharing tetrahedral frameworks where at least a portion of the tetrahedral sites are occupied by an element other than silicon or aluminum. Specific non-limiting examples of non-zeolitic molecular sieves include silicoaluminophosphates such as SAPO-34, SAPO-37 and SAPO-44.

The SCR catalyst can comprise a small pore, medium pore or large pore molecular sieve, or combinations thereof.

The SCR catalyst can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof. The SCR catalyst can comprise a small pore molecular sieve selected from the group of Framework Types consisting of ACO, AEI, AEN, AFN, AFT, AFX, ANA, APC. APD, ATT, CDO, CHA, DDR, DFT, EAB, EDI, EPI, ERI, GIS, GOO, IHW, ITE, ITW, LEV, KFI, MER, MON, NSI, OWE, PAU. PHI, RHO, RTH, SAT, SAV, SIV, THO, TSC, UEI, UFI, VNI, YUG, and ZON, and mixtures and/or intergrowths thereof. Preferably the small pore molecular sieve is selected from the group of Framework Types consisting of CHA, LEV, AEI, AFX, ERI, SFW, KFI, DDR and ITE.

The SCR catalyst comprises can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. Preferably, the medium pore molecular sieve selected from the group of Framework Types consisting of MFI, FER and STT.

The SCR catalyst can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of MOR, OFF and BEA.

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Metals may be in one of several forms, including, but not limited to, zero valent metal atoms or clusters, isolated cations, mononuclear or polynuclear oxycations, or as extended metal oxides. Preferably, the metals can be iron, copper, and mixtures or combinations thereof.

The metal can be combined with the zeolite using a mixture or a solution of the metal precursor in a suitable solvent. The term "metal precursor" means any compound or complex that can be dispersed on the zeolite to give a catalytically-active metal component. Preferably the solvent is water due to both economics and environmental aspects of using other solvents. When copper, a preferred metal is used, suitable complexes or compounds include, but are not limited to, anhydrous and hydrated copper sulfate, copper nitrate, copper acetate, copper acetylacetonate, copper oxide, copper hydroxide, and salts of copper amines (e.g. $[Cu(NH_3)_4]^{2+}$). This invention is not restricted to metal precursors of a particular type, composition, or purity. The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve.

A metal exchanged molecular sieve can contain in the range of about 0.10% and about 10% by weight of a group VB, VIB, VIIB, VIIIB, IB, or IIB metal located on extra-framework sites on the external surface or within the channels, cavities, or cages of the molecular sieve. Preferably, the extra framework metal can be present in an amount of in the range of about 0.2% and about 5% by weight.

The metal exchanged molecular sieve can be a copper (Cu) supported small pore molecular sieve having from about 0.1 to about 20.0 wt. % copper of the total weight of the catalyst. Preferably copper is present from a about 1 wt. % to about 6 wt. % of the total weight of the catalyst, more preferably from about 1.8 wt. % to about 4.2 wt. % of the total weight of the catalyst.

The metal exchanged molecular sieve can be an iron (Fe) supported small pore molecular sieve having from about 0.1 to about 20.0 wt. % iron of the total weight of the catalyst. Preferably iron is present from a about 1 wt. % to about 6 wt. % of the total weight of the catalyst, more preferably from about 1.8 wt. % to about 4.2 wt. % of the total weight of the catalyst.

The catalyst article can have an increase in backpressure compared to the backpressure of the untreated high porosity substrate of less than or equal to 100% of the backpressure of the untreated high porosity substrate when tested using a SuperFlow SF-1020 at a flow of 200 cfm or greater. The increase in backpressure can be at least about 75%, at least about 80%, at least about 85%, at least about 90%, or at least about 95%.

The catalyst article can have a loss of SCR catalyst coating on the wall of the high porosity support of less than 2% when the article is subjected to a stream of air from an AirTX fixed flow nozzle at a pressure of 90 psi, where the article is placed 12.7 mm from the face of the nozzle and the nozzle passes across the article at a speed of 6.7 mm/s. A series of passes, 3.1 mm apart, can be made across the catalyst article. The loss of SCR catalyst coating on the wall of the high porosity support can be about 1%, about 0.5%, about 0.4%, about 0.3%, about 0.2%, about 0.1%, about 0.05%, or about 0.01%.

The high porosity catalyst article can have an increase in $N_2$ selectivity compared to a comparable article comprising a substrate having a porosity less than a high porosity substrate. The porosity of the comparable article can be less than about 40%, preferably less than or equal to 35%. One of ordinary skill in the art would recognize that the amount of increase could be dependent upon the SCR catalyst used and upon the test conditions.

In another aspect, methods of preparing the catalytic article comprise: (a) applying platinum, palladium, supported platinum, supported palladium or a mixture thereof to a high porosity substrate and (b) applying an SCR catalyst in a washcoat layer to the high porosity substrate containing platinum, palladium, supported platinum, supported palladium or a mixture thereof.

Platinum, palladium, or a mixture thereof, can be applied to the high porosity support by impregnating the high porosity substrate with a solution, preferably aqueous, of a salt of platinum, palladium, or a mixture thereof. Platinum, palladium, or a mixture thereof, can be applied to the high porosity substrate in a suspension. Platinum, palladium, or a mixture thereof can also be applied to the high porosity support as a supported platinum, a supported palladium or a mixture thereof. The platinum or palladium can be applied as a platinum or palladium precursor. The term "platinum precursor" means any compound or complex which decomposes or otherwise converts to a catalytically active form upon calcination or heating. Suitable platinum complexes or compounds include, but are not limited to platinum chlorides (e.g. salts of $[PtCl_4]^{2-}$, $[PtCl_6]^{2-}$), platinum hydroxides (e.g. salts of $[Pt(OH)_6]^{2-}$), platinum amines (e.g. salts of $[Pt(NH_3)_4]^{2+}$, $[Pt(NH_3)_4]^{4+}$), platinum hydrates (e.g. salts of $[Pt(OH_2)_4]^{2+}$), platinum bis(acetylacetonates), and mixed compounds or complexes (e.g. $[Pt(NH_3)_2(Cl)_2]$). The term "palladium precursor" is used in the same manner as described above for the term "platinum precursor". This invention is not restricted to platinum or palladium precursors of a particular type, composition, or purity.

The terms "supported platinum" and "supported palladium" means a composition comprising platinum, palladium or a precursor thereof on a support. Various types of supports are known in the art, such as alumina, titania, silica, zirconia, ceria, molecular sieves, and mixtures thereof. A mixture or solution of a platinum or a palladium precursor can be added to the support by impregnation or by coprecipitation of the platinum or palladium precursor with the support.

The supported platinum, supported palladium or a mixture thereof, can be applied to the high porosity substrate in a washcoat. A washcoat is a suspension comprising catalyst, additives, and a solvent, preferably water. The washcoat preferably has a solids content within the range of 20 to 60 wt. %, more preferably 25 to 50 wt. %, most preferably 30 to 40 wt. %. Water is preferably present at 40 to 80 wt. %, more preferably 50 to 75 wt. %, most preferably 60 to 70 wt. %. The solids content comprises the catalyst and any additives. Usually, the solids comprise 50 to 99 wt. %, more preferably 60 to 95 wt. %, and most preferably 75 to 85 wt. % of catalyst. The additives, which may include glass particles, alumina, silica, silica-aluminas, ceramics, molecular sieves, zeolites, clays, inorganic oxides, minerals, polymers, or other materials, make up the balance of the solids content. Preferably, the solids comprise 1 to 50 wt. %, more preferably 5 to 40 wt. %, most preferably 15 to 25 wt. % of the additives. The washcoat components are combined in any desired order and are mixed until a homogeneous suspension is created. Preferably, high-shear mixing is used.

When the supported platinum, supported palladium or a mixture thereof is applied to the high porosity substrate in a washcoat, a portion of the supported platinum, supported palladium or a mixture thereof can be located within the walls of the high porosity and a portion can be located on the walls of the high porosity substrate.

The catalyst article can have platinum, palladium or a mixture thereof present on, or in, at least a portion of one side of the high porosity substrate. Preferably, platinum, palladium or a mixture thereof is present on, or in, at least half of one side of the high porosity substrate, more preferably platinum, palladium or a mixture thereof is present on substantially all of one side of the high porosity substrate. The term "substantially all", as used herein, means at least 90%, preferably at least 95%, more preferably at least 99%. The catalyst article can have platinum, palladium or a mixture thereof present on, or in, at least a portion of both sides of the high porosity substrate. When the platinum, palladium or a mixture thereof is present on, or in, both sides of the substrate, it can be present in at least half of at least one side of the high porosity substrate. When the platinum, palladium or a mixture thereof is present on, or in, both sides of the substrate, it can be present in at least half of both sides of the high porosity substrate.

The SCR catalyst coating is present over at least the portions of the wall of the high porosity substrate that contains platinum, palladium or a mixture thereof. When the platinum, palladium or a mixture thereof is located on both sides of the wall of the substrate, the SCR catalyst coating is placed on both walls over at least the portions of the wall of the high porosity substrate that contains platinum, palladium or a mixture thereof. When the platinum, palladium or a mixture thereof is located on only one side of the wall of the substrate, the SCR catalyst coating can be placed on both walls of the high porosity substrate where at least the portion of the wall that contains platinum, palladium or a mixture thereof is coated by the SCR catalyst.

The highly porous substrate with the platinum, palladium, supported platinum, a supported palladium or a mixture thereof, can then be dried and calcined at a temperature within the range of 400° C. to 1200° C., preferably 450° C. to 700° C., and more preferably 500° C. to 650° C. The calcination is preferably done under dry conditions, but it can also be performed hydrothermally, i.e., in the presence of some moisture content. Calcination can be performed for a time of between about 30 minutes and about 4 hours, preferably between about 30 minutes and about 2 hours, more preferably between about 30 minutes and about 1 hour.

The SCR catalyst is then applied in a washcoat layer onto the high porosity substrate containing the platinum, palladium, supported platinum, a supported palladium or a mixture thereof. One or more applications of the washcoat containing the SCR catalyst are made to the high porosity substrate. The washcoat layer(s) is dried and calcined as described above.

In yet another aspect, a method of purifying an exhaust gas comprising NOx comprises contacting an exhaust gas comprising NOx with a catalyst article comprising: (a) a high porosity substrate comprising platinum, palladium or a mixture thereof in the wall of the high porosity substrate and (b) an SCR catalyst coating on a wall of the high porosity substrate, where the platinum, palladium or mixture thereof is present in the wall of the high porosity support as a metal, or as a supported platinum, palladium or a mixture thereof. The exhaust gas comprises ammonia or an ammonia precursor, such as for example, urea, ammonium carbonate, ammonium carbamate, ammonium hydrogen carbonate, and ammonium formate. Ammonia and urea are preferred and ammonia is particularly preferred. The high porosity substrate can have a porosity of about 40% to about 80%. The platinum, palladium or a mixture thereof, or the supported platinum, palladium or a mixture thereof, can also be present as a coating on the wall of the high porosity support. The article can comprise from about 0.1 wt. % to about 1 wt. % of platinum or about 0.1 wt. % to about 2 wt. % of palladium.

The SCR catalyst can be an oxide of a base metal, a molecular sieve, a metal exchanged molecular sieve or a mixture thereof. The SCR catalyst can comprise a base metal selected from the group consisting of vanadium (V), molybdenum (Mo) and tungsten (W), chromium (Cr), cerium (Ce), manganese (Mn), iron (Fe), cobalt (Co), nickel (Ni), and copper (Cu), and mixtures thereof. The SCR catalyst can comprise a molecular sieve or a metal exchanged molecular sieve. The molecular sieve or the metal exchanged molecular sieve can be small pore, medium pore, large pore or a mixture thereof.

The catalyst article can further comprise at least one base metal promoter. The at least one base metal promoter can be selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The metal exchanged molecular sieve can be a copper (Cu) supported small pore molecular sieve having from about 0.1 to about 20.0 wt. % copper to the total weight of the catalyst.

The SCR catalyst can comprise a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof.

The SCR catalyst can comprise a small pore molecular sieve selected from the group of Framework Types consisting of ACO, AEI, AEN, AFN, AFT, AFX, ANA, APC, APD, ATT, CDO, CHA, DDR. DFT, EAB, EDI, EPI, ERI, GIS. GOO, IHW, ITE, ITW. LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof. The SCR catalyst can preferably comprise a small pore molecular sieve selected from the group of Framework Types consisting of CHA, LEV, AEI, AFX, ERI, SFW, KFI, DDR and ITE.

The SCR catalyst can comprise a medium pore molecular sieve selected from the group of Framework Types consisting of AEL, AFO, AHT, BOF, BOZ. CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI, and WEN, and mixtures and/or intergrowths thereof. The SCR catalyst preferably comprises a medium pore molecular sieve selected from the group of Framework Types consisting of MFI, FER and STT.

The SCR catalyst can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. The SCR catalyst preferably comprises a large pore molecular sieve selected from the group of Framework Types consisting of MOR, OFF and BEA.

The method of purifying the exhaust gas can result in an increase in backpressure across the high porosity support that is less than or equal to 100% of the backpressure of the untreated high porosity substrate when tested using a SuperFlow SF-1020 at a flow of 200 cfm or greater. The increase in backpressure can be at least about 75%, at least about 80%, at least about 85%, at least about 90%, or at least about 95%.

The method of purifying the exhaust gas can have a loss of SCR catalyst coating on the wall of the high porosity support of less than 2% when the article is subjected to a stream of air from an AirTX fixed flow nozzle at a pressure of 90 psi, where the article is placed 12.7 mm from the face of the nozzle and the nozzle passes across the article at a speed of 6.7 mm/s. A series of passes, 3.1 mm apart, can be made across the catalyst article. The loss of SCR catalyst coating on the wall of the high porosity support can be ≤1%, ≤0.5%, ≤0.4%, ≤0.3%, ≤0.2%, ≤0.1%, ≤0.05%, or ≤0.01%.

The method can provide over 90% conversion of ammonia to nitrogen ($N_2$ selectivity) at temperatures from 350° C. to 450° C. and can provide over 80% conversion of ammonia to nitrogen at 550° C. The method can provide increased conversion of ammonia to nitrogen over a temperature range of about 250° C. to about 550° C., compared to a comparable article comprising a substrate having a porosity less than a high porosity substrate. The porosity of the comparable article can be less than about 40%, preferably less than or equal to 35%. The amount on increased conversion of ammonia to nitrogen ($N_2$ selectivity) can be at least about 2.5, preferably at least about 5%, more preferably at least about 7.5%.

The exhaust gas comprising NOx can be contacted with a catalytic article described above at a temperature of about 150° C. to about 550° C., preferably at a temperature of about 200° C. to about 550° C., more preferably at a temperature of about 250° C. to about 550° C.

The following examples merely illustrate the invention; the skilled person will recognize many variations that are within the spirit of the invention and scope of the claims.

EXAMPLES

Five different catalyst articles, each having a top and a bottom layer, were prepared as described below. Example 1 used a low porosity (35%) honeycomb wall flow substrate ("LP filter") and Examples 2-5 used a high porosity (about 50%) honeycomb wall flow substrate ("HP filter") and.

Example 1: Low Porosity Substrate—Comparative Example

A catalytic article was prepared by first forming a bottom layer on a low porosity substrate (Corning 300/5, 35% porosity) by coating a washcoat slurry comprising alumina, succinic acid and a solution of platinum nitrate on a low porosity honeycomb wall flow substrate by applying the washcoat onto the substrate then using a vacuum to pull the washcoat into the substrate. The washcoat slurry contained 7.20% solids by weight and had a particle size distribution d50 of about 6.0 plm. The platinum load on the article was 1.99 g/ft$^3$. The substrate was dried to remove moisture, and then calcined at about 500° C. for about 1 hour.

A washcoat slurry comprising alumina, hydroxyethyl cellulose and a copper containing CHA zeolite (3.33% CU) was applied as a top layer onto the platinum impregnated substrate by applying the washcoat onto the substrate then using a vacuum to pull the washcoat into the substrate. The washcoat slurry contained 31.21% solids by weight and had a particle size distribution d50 of about 6.0 μm. The slurry was applied at a loading of 2.48 g/in$^3$, resulting a copper load of 124 g/ft$^3$.

After the top coat was applied, the article was dried and calcined at about 500° C. for about 1 hour.

Example 2: Standard High Porosity Substrate

A catalytic article was prepared by first forming a bottom layer on a high porosity honeycomb wall flow substrate ("HP substrate") (NGK 300/6.5 Material D, having a porosity of about 50%)(This substrate was used in Example 2-5) by dip coating a washcoat slurry comprising alumina, succinic acid and platinum nitrate on the HP substrate. The washcoat slurry contained 8.61% solids by weight. The high porosity honeycomb wall flow substrate ("HP substrate") with the bottom layer was calcined at about 500° C. for about 1 hour.

The top layer was applied to the substrate as described in Example 1.

The article had a platinum load of 1.97 g/ft$^3$ in the bottom layer and a copper load of 125.5 g/ft3 in the top layer.

After the wash coat was applied, the article was dried and calcined as described above in Example 1.

Example 3: Platinum Impregnated into Substrate—No Bottom Layer

A catalytic article was prepared by first impregnating a high porosity honeycomb wall flow substrate with a solution of platinum nitrate to produce a platinum load on the article of 1.97 g/ft$^3$. The substrate was dried to remove moisture, and then calcined at about 500° C. for about 30 minutes to about 1 hour.

The top layer was applied to the substrate as described in Example 1.

The slurry was applied at a loading of 2.48 g/in$^3$, resulting in a copper load of 125 g/ft$^3$.

After the wash coat was applied, the article was dried and calcined as described above in Example 1.

Example 4: Platinum on SiO$_2$ in the Bottom Layer

A catalytic article was prepared by first forming a bottom layer on a high porosity honeycomb wall flow substrate ("HP substrate") by dip coating a washcoat slurry comprising silicon dioxide and platinum nitrate on the HP substrate. The washcoat slurry contained 8.61% solids by weight. The article had a platinum load of 1.99 g/ft$^3$.

The top layer was applied to the substrate as described in Example 1. The slurry was applied at a loading of 2.52 g/in$^3$, resulting in a copper load of 127 g/ft$^3$.

After the wash coat was applied, the article was dried and calcined as described above in Example 1.

Example 5: Platinum on SiO$_2$—TiO$_2$ in the Bottom Layer

A catalytic article was prepared by first forming a bottom layer on a high porosity honeycomb wall flow substrate ("HP substrate") by dip coating a washcoat slurry comprising silicon dioxide and platinum nitrate on the HP substrate. The washcoat slurry contained 8.61% solids by weight. The article had a platinum load of 2.01 g/ft$^3$.

The top layer was applied to the substrate as described in Example 1. The slurry was applied at a loading of 2.52 g/in$^3$, resulting a copper load of 127 g/ft$^3$.

After the wash coat was applied, the article was dried and calcined as described above in Example 1.

Example 6

The catalytic activity of each of the articles of Examples 1-5 was evaluated by measuring the steady-state NH$_3$ oxidation activities of each of the articles at 150, 200, 250, 300, 350, 450 and 550° C. using the following gas composition:

| | Gas | | | | | | |
|---|---|---|---|---|---|---|---|
| | O$_2$ | NH$_3$ | CO | C$_3$H$_6$ | H$_2$O | CO$_2$ | N$_2$ |
| Concentration | 10% | 200 ppm | 0 ppm | 0 ppm | 4.5% | 4.5% | balance |

The concentrations of ammonia, NO, NO$_2$ and N$_2$O were determined using FTIR. Space velocities of 60,000 h$^{-1}$ and 120,000 h$^{-1}$ were evaluated.

FIG. 1 is a graph showing the percent conversion of ammonia to nitrogen for articles of Examples 1-5 at a space velocity of 60,000 h$^{-1}$. The conversion of ammonia at temperatures from 300° C. to 550° C. was the same for all five articles. Articles of Examples 1-5 provided ammonia conversions of from about 88% to about 96% a temperature of 250° C. with articles of Examples 1-4 providing between 90% and 96% ammonia conversion.

FIG. 2 is a graph showing N$_2$ selectivity for Examples 1-5 at a space velocity of 60,000 h$^{-1}$. The low porosity substrate provided less conversion of ammonia to nitrogen (N$_2$ selectivity) throughout the temperatures range from 250° C. to 550° C. relative to each of the high porosity articles. Each of the high porosity substrate articles provided increased N$_2$ selectivity relative to the low porosity substrate, with from about 4% to about 10% more selectivity, depending upon the article and the temperature, with platinum on a silica support consistently providing increased selectivity of between about 5% and 10%.

FIG. 3 is a graph showing the percent conversion of ammonia to nitrogen for Examples 1-5 at a space velocity of 120,000 h$^{-1}$. The high porosity substrate articles provided the same or better conversion of ammonia to nitrogen at temperatures from 300° C. to 550° C.

FIG. 4 is a graph showing $N_2$ selectivity for Examples 1-5 at a space velocity of 120,000 h$^{-1}$. The low porosity substrate provided less conversion of ammonia to nitrogen ($N_2$ selectivity) throughout the temperatures range from 250° C. to 550° C. relative to each of the high porosity articles. Articles containing high porosity substrates provided up to about 8% higher conversion than that provided by the low porosity substrate.

FIG. 5 is a graph showing the concentration of $N_2O$ at the outlet from the system at a space velocity of 60,000 h$^{-1}$. The low porosity substrate provided high concentrations of $N_2O$ from temperatures of 250° C. to about 350° C. relative to each of the high porosity articles. The high porosity articles, especially the article with platinum on silica, provided less formation of $N_2O$ than that provided by the low porosity substrate.

FIG. 6 is a graph showing the concentration of $N_2O$ at the outlet from the system at a space velocity of 120,000 h$^{-1}$. The low porosity substrate provided high concentrations of $N_2O$ from temperatures of 250° C. to about 350° C. relative to each of the high porosity articles. The high porosity articles, especially the article with platinum on silica, provided less formation of $N_2O$ than that provided by the low porosity substrate.

FIG. 7 is a graph showing the NOx concentration at the outlet from the system at a space velocity of 60,000 h$^{-1}$. The low porosity substrate provided higher concentrations of NOx at temperatures above about 300° C. relative to each of the high porosity articles. The high porosity articles provided about 10 ppm less NOx than that provided by the low porosity substrate at temperatures from about 400° C. to about 550° C.

FIG. 8 is a graph showing the NOx concentration at the outlet from the system at a space velocity of 120,000 h$^{-1}$. The low porosity substrate provided higher concentrations of NOx at temperatures above about 300° C. relative to each of the high porosity articles. The high porosity articles provided about 10 ppm less NOx than that provided by the low porosity substrate at temperatures from about 450° C. to about 550° C., and about 5 ppm less NOx than that provided by the low porosity substrate at temperatures of about 400° C.

Example 7

The backpressure of each of the catalyst articles, an untreated low porosity substrate and an untreated high porosity substrate was measured using a SuperFlow SF-1020 at a flow of 200 cfm. The percent increase in backpressure, relative to the untreated corresponding substrate, is shown in Table 1.

TABLE 1

| Example | % increase in back pressure |
|---------|------------------------------|
| 1 | 110.8 |
| 2 | 81.9 |
| 3 | 75.8 |
| 4 | 88.1 |
| 5 | 81.0 |

The high porosity articles provided less than a 100% increase in back pressure, compared to the low porosity substrate that had a 110% increase in back pressure. The increase in back pressure in the high porosity articles was also less than 95% and less than 90%. In some examples, the increase in backpressure was less 85% and less than 80%

Example 8

The loss of SCR catalyst coating on the walls of the catalyst articles can be determined by subjecting each of the articles to a stream of air from an AirTX fixed flow nozzle at a pressure of 90 psi, where the article is placed 12.7 mm from the face of the nozzle and the nozzle passes across the article at a speed of 6.7 mm/s. A series of passes, 3.1 mm apart, can be made across the catalyst article.

Each of the catalytic articles on the high porosity substrate can have a loss of ≤1%, ≤0.5%, ≤0.4%, ≤0.3%, ≤0.2%, ≤0.1%, ≤0.05%, or ≤0.01%.

The preceding examples are intended only as illustrations; the following claims define the scope of the invention.

We claim:

1. A catalyst article comprising: (a) a high porosity substrate comprising platinum, palladium or a mixture thereof in the wall of the high porosity substrate and (b) an SCR catalyst coating on a wall of the high porosity substrate, where the platinum, palladium or mixture thereof is present in the wall of the high porosity substrate as a metal, or as a supported platinum, palladium or a mixture thereof.

2. The catalyst article of claim 1, wherein the platinum, palladium or a mixture thereof, or the supported platinum, palladium or a mixture thereof, is also present as a coating on the wall of the high porosity substrate.

3. The catalyst article of claim 1, wherein the SCR catalyst coating is present on both sides of at least a portion of a wall of the high porosity substrate.

4. The catalyst article of claim 3, wherein the platinum, palladium or a mixture thereof is present on both sides of at least a portion of a wall of the high porosity substrate.

5. The catalyst article of claim 1, wherein the catalyst article has an increase in backpressure compared to the backpressure of the untreated high porosity substrate of less than or equal to 100%.

6. The catalyst article of claim 1, wherein the catalyst article has a loss of SCR catalyst coating on the wall of the high porosity substrate of less than 2%.

7. The catalyst article of claim 1, wherein the high porosity substrate has a porosity of about 40% to about 80%.

8. The catalyst article of claim 1, wherein the SCR catalyst is an oxide of a base metal, a molecular sieve, a metal exchanged molecular sieve or a mixture thereof.

9. The catalyst article of claim 1, wherein SCR catalyst comprises a base metal selected from the group consisting of vanadium (V), molybdenum (Mo) and tungsten (W), chromium (Cr), cerium (Ce), manganese (Mn), iron (Fe), cobalt (Co), nickel (Ni), and copper (Cu), and mixtures thereof.

10. The catalyst article of claim 9, wherein the metal exchanged molecular sieve is a copper (Cu) supported small pore molecular sieve having from about 0.1 to about 20.0 wt % copper to the total weight of the catalyst.

11. The catalyst article of claim 1, wherein SCR catalyst comprises a molecular sieve or a metal exchanged molecular sieve.

12. The catalyst article of claim 11, wherein the molecular sieve or the metal exchanged molecular sieve is small pore, medium pore, large pore or a mixture thereof.

13. The catalyst article of claim 1, wherein the catalyst article comprises from about 0.1 wt % to about 1 wt % of platinum or about 0.1 wt % to about 2 wt % of palladium.

14. The catalyst article of claim 1, further comprising at least one base metal promoter.

15. The catalyst article of claim 14, wherein the at least one base metal promoter is selected from the group consisting of neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof.

16. The catalyst article of claim 1, wherein the SCR catalyst comprises a small pore molecular sieve selected from the group consisting of aluminosilicate molecular sieves, metal-substituted aluminosilicate molecular sieves, aluminophosphate (AlPO) molecular sieves, metal-substituted aluminophosphate (MeAlPO) molecular sieves, silico-aluminophosphate (SAPO) molecular sieves, and metal substituted silico-aluminophosphate (MeAPSO) molecular sieves, and mixtures thereof.

17. The catalyst article of claim 1, wherein the SCR catalyst comprises a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, and mixtures and/or intergrowths thereof.

18. The catalyst article of claim 1, wherein the SCR catalyst comprises a small pore molecular sieve selected from the group of Framework Types consisting of CHA, LEV, AEI, AFX, ERI, SFW, KFI, DDR and ITE.

19. The catalyst article of claim 1, wherein the SCR catalyst comprises is a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STI, STW, -SVR, SZR, TER, TON, TUN, UOS, VSV, WEI, and WEN, and mixtures and/or intergrowths thereof.

20. The catalyst article of claim 1, wherein the SCR catalyst comprises is a medium pore molecular sieve selected from the group of Framework Types consisting of MFI, FER and ST.

21. The catalyst article of claim 1, wherein the SCR catalyst comprises is a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof.

22. The catalyst article of claim 1, wherein the SCR catalyst comprises is a large pore molecular sieve selected from the group of Framework Types consisting of MOR, OFF and BEA.

23. The catalyst article of claim 1, said catalyst article converting NOx to $N_2$ with a greater selectivity than a comparable catalyst article comprising a substrate having a porosity less than the porosity of a high porosity substrate.

24. A method of purifying an exhaust gas comprising NOx, comprising contacting an exhaust gas comprising NOx with a catalytic article of claim 1.

25. The method of claim 24, wherein the exhaust gas comprising NOx is contacted with a catalytic article at a temperature of about 150° C. to about 550° C.

26. The method of claim 24, wherein the method converts NOx to $N_2$ and the $N_2$ selectivity is greater than the $N_2$ selectivity from a comparable catalyst article comprising a substrate having a porosity less than the porosity of a high porosity substrate.

* * * * *